(12) United States Patent
Altinger et al.

(10) Patent No.: US 10,338,598 B2
(45) Date of Patent: Jul. 2, 2019

(54) METHOD FOR OPERATING AN AUTOMATICALLY DRIVEN, DRIVERLESS MOTOR VEHICLE AND MONITORING SYSTEM

(71) Applicant: AUDI AG, Ingolstadt (DE)

(72) Inventors: Harald Altinger, Gerolfing (DE); Florian Schuller, Ismaning (DE)

(73) Assignee: Audi AG, Ingolstadt (DE)

( * ) Notice: Subject to any disclaimer, the term of this patent is extended or adjusted under 35 U.S.C. 154(b) by 139 days.

(21) Appl. No.: 15/518,447

(22) PCT Filed: Oct. 7, 2015

(86) PCT No.: PCT/EP2015/001967
§ 371 (c)(1),
(2) Date: Apr. 11, 2017

(87) PCT Pub. No.: WO2016/055159
PCT Pub. Date: Apr. 14, 2016

(65) Prior Publication Data
US 2017/0308092 A1 Oct. 26, 2017

(30) Foreign Application Priority Data
Oct. 11, 2014 (DE) .................. 10 2014 015 075

(51) Int. Cl.
*G05D 1/02* (2006.01)
*B62D 15/02* (2006.01)
(Continued)

(52) U.S. Cl.
CPC .......... *G05D 1/0246* (2013.01); *B60W 30/06* (2013.01); *B62D 15/0285* (2013.01);
(Continued)

(58) Field of Classification Search
CPC ... G05D 1/0246; G05D 1/0285; B60W 30/06; B62D 15/0285; G06K 9/00805
(Continued)

(56) References Cited

U.S. PATENT DOCUMENTS 8,593,521 B2 * 11/2013 Schofield ........... G06K 9/00818
348/148
8,639,644 B1 1/2014 Hickman et al.
(Continued)

FOREIGN PATENT DOCUMENTS

| CN | 102706354 A | 10/2012 |
|---|---|---|
| CN | 102721420 A | 10/2012 |

(Continued)

OTHER PUBLICATIONS

International Search Report and Written Opinion of the International Searching Authority directed to related International Patent Application No. PCT/EP2015/001967, dated May 24, 2016, with attached English-language translation; 23 pages.

(Continued)

*Primary Examiner* — Thomas G Black
*Assistant Examiner* — Wae L Louie
(74) *Attorney, Agent, or Firm* — Sterne, Kessler, Goldstein & Fox P.L.L.C.

(57) ABSTRACT

A method for operating an automatically guided, driverless motor vehicle is provided. Sensor data detected by environmental sensors of the motor vehicle is evaluated with respect to objects to be taken into account in trajectory planning. The objects can be classified as an obstacle or not an obstacle using at least one classifier. If an object that cannot be classified or cannot be classified with sufficient certainty as an obstacle or not an obstacle, at least one camera image of the respective object is taken, transmitted to a portable mobile communication device carried along by a user of the (Continued)

motor vehicle, and displayed there. An input, classifying the object as an obstacle or not an obstacle, of a user is accepted as classification information.

15 Claims, 4 Drawing Sheets (51) Int. Cl.
    *B60W 30/06* (2006.01)
    *G06K 9/00* (2006.01)
    *G06K 9/62* (2006.01)
(52) U.S. Cl.
    CPC ....... *G05D 1/0285* (2013.01); *G06K 9/00805* (2013.01); *G06K 9/6267* (2013.01)
(58) Field of Classification Search
    USPC .......................................................... 701/28
    See application file for complete search history.

(56) References Cited

U.S. PATENT DOCUMENTS

| | | | |
|---|---|---|---|
| 9,308,917 B2* | 4/2016 | Oh | B60W 30/16 |
| 9,316,502 B2* | 4/2016 | Moore | G01C 21/165 |
| 9,368,030 B2 | 6/2016 | Hainzlmaier et al. | |
| 2005/0060069 A1* | 3/2005 | Breed | B60N 2/2863 |
| | | | 701/408 |
| 2010/0013615 A1 | 1/2010 | Hebert et al. | |
| 2012/0062743 A1* | 3/2012 | Lynam | B60Q 9/005 |
| | | | 348/148 |
| 2013/0314503 A1* | 11/2013 | Nix | G06K 9/00805 |
| | | | 348/46 |
| 2014/0029852 A1 | 1/2014 | Pisipati et al. | |
| 2014/0067206 A1* | 3/2014 | Pflug | B60W 10/04 |
| | | | 701/41 |
| 2015/0127208 A1 | 5/2015 | Jecker et al. | |
| 2015/0331422 A1* | 11/2015 | Hartung | G05D 1/021 |
| | | | 701/23 |
| 2016/0082597 A1* | 3/2016 | Gorshechnikov | G06N 5/02 |
| | | | 700/253 |
| 2016/0086391 A1* | 3/2016 | Ricci | G07C 5/008 |
| | | | 701/29.3 |
| 2016/0247394 A1* | 8/2016 | Stenneth | G08G 1/0112 |
| 2016/0362050 A1* | 12/2016 | Lee | B60R 1/00 |
| 2017/0132482 A1* | 5/2017 | Kim | B60K 35/00 |
| 2017/0308092 A1* | 10/2017 | Altinger | B62D 15/0285 |

FOREIGN PATENT DOCUMENTS

| | | |
|---|---|---|
| DE | 10 2012 200 625 A1 | 7/2013 |
| DE | 10 2012 200 725 A1 | 7/2013 |
| DE | 10 2012 007 986 A1 | 10/2013 |
| DE | 10 2012 014 207 A1 | 1/2014 |
| DE | 10 2012 022 207 B3 | 1/2014 |
| EP | 2 689 650 A1 | 1/2014 |

OTHER PUBLICATIONS

International Preliminary Report on Patentability directed to related International Patent Application No. PCT/EP2015/001967, dated Apr. 11, 2017, with attached English-language translation; 20 pages.

* cited by examiner

METHOD FOR OPERATING AN AUTOMATICALLY DRIVEN, DRIVERLESS MOTOR VEHICLE AND MONITORING SYSTEM

TECHNICAL FIELD

The invention relates to a method for operating an automatically guided, driverless motor vehicle, in particular a passenger car, wherein sensor data detected by environmental sensors, including at least one camera, of the motor vehicle are evaluated with respect to objects to be taken into account in trajectory planning, which objects can be classified as an obstacle or not an obstacle by means of at least one classifier evaluating the associated sensor data. The invention additionally relates to a monitoring system with a motor vehicle and a mobile communication device.

BACKGROUND

The automation of the vehicle operation, even for passenger cars and other motor vehicles used in road traffic, is an increasingly occurring equipment feature. For example, driver assistance systems are already known, which can take over the parking process for a driver and the like. It was proposed to have a motor vehicle parked fully automatically and driverlessly into a target parking space in other areas, such as dedicated parking environments, in particular a parking garage.

An essential component of vehicle systems that are designed to fully automatically guide motor vehicles, in particular in the absence of the driver, is the classification of objects detected by environmental sensors of the motor vehicle as an obstacle or not an obstacle in order to be able to plan the further trajectory of the automatic operation. Environmental sensors, such as cameras, radar sensors, Lidar sensors, ultrasonic sensors, and the like, therefore deliver sensor data that describe objects in the environment of the motor vehicle and that can be evaluated within the framework of a sensor fusion to different object information for the individual objects or individual segments of the environment. It is known in this context to use classifiers, in particular as algorithms implemented by software, in order to determine whether an object poses a danger or whether it can be driven over or under in the respective current driving situation. It is known, for example, to use environmental models of the motor vehicle, which models use layout maps and/or are object-based and which models contain the fused and possibly already at least partially evaluated sensor data, which can be differentiated by objects and thus can allow an appropriate classification of objects as an obstacle or not an obstacle. In the process, classifiers may also naturally be used, which allow for a further, more accurate classification of objects so that traffic signs, bollards, curbstones, and the like can, for example, be identified automatically, wherein it is however at least attempted by means of the classifier to determine whether or not the object is an obstacle for the motor vehicle, wherein the classification as an obstacle or not an obstacle can also depend on the current driving situation.

It is however in many cases not trivial to determine whether or not an object constitutes an obstacle. For example, the case can occur that an object is unknown in the classifiers used and thus cannot be assigned at all or cannot be assigned with sufficient certainty. Problems can also occur if a kind of "sensor deception" occurs, i.e. if, for example, an object appearing to be solid is not solid or a color change is not a three-dimensional object. Typical examples for such objects that are hard to identify or can be erroneously classified as an obstacle, for example, are leaves, boxes made of cardboard or paper, darker spots on the road that could be classified as a hole, and the like.

It may in particular occur in the automatic operation of motor vehicles that a current target position or a current destination cannot be reached because on object was erroneously classified as an obstacle or danger. Such problems can occur in the current prior art since an ability to generically and unambiguously interpret general objects cannot as of yet be completely technically realized by the environmental sensor system of the motor vehicle.

DETAILED DESCRIPTION

The invention is therefore based on the task of improving the fully automatic guidance of motor vehicles in the driverless case by an improved classification of objects that are difficult to classify.

In order to solve this task, it is provided according to the invention in a method of the aforementioned type that in case of an object that cannot be classified at all or cannot be classified with sufficient certainty as an obstacle or not an obstacle and/or in case of at least one object preventing the further drive of the motor vehicle to a current destination, at least one camera image of the respective object is taken with at least one of the at least one camera, transmitted to a portable mobile communication device carried along by a user of the motor vehicle, and displayed there; an input, classifying the object as an obstacle or not an obstacle, by the user is accepted as classification information; the classification information is transmitted back to the motor vehicle and is taken into account in the further automatic guidance of the motor vehicle.

The idea on which the invention is based is thus to draw upon the driver or another person, such as a person monitoring a parking garage, who can better evaluate objects based on image materials available and possibly additionally transmitted data, as an additional classifier in order to be able to nonetheless correctly classify objects that are difficult to classify and/or in case of an erroneous "getting stuck" of the motor vehicle to nonetheless allow for a further drive if an object was erroneously classified as an insurmountable obstacle for the motor vehicle. In a case, in which a motor vehicle, in particular a passenger car, is operated driverlessly and completely automatically, i.e. an automatic longitudinal and lateral guidance of the motor vehicle is provided, cameras of the motor vehicle are therefore used as image recording device in order to provide the driver a camera image of the object as potential obstacle in certain situations so that the driver can accept the further drive (object is not an obstacle) or can classify the object as a danger/obstacle.

As is already basically known, during automatic operation without any intervention of a driver, objects in the environment of the motor vehicle are therefore classified and the operation of the motor vehicle is controlled based on this classification. In order to allow for the classification, it can be provided, as is basically known, to perform a sensor fusion of the sensor data of the different environmental sensors in order to in particular create an environmental model of the motor vehicle, which model can, for example, be available in the form of a layout map and/or as an object-based model. If a layout map is, for example, used, information can be assigned to individual segments of the environment of the motor vehicle as to whether or not an object is present there (occupied=obstacle), wherein the assignment of additional meta data is also possible, such as in case of so-called tree maps, in which meta data are stored in a tree structure. Object-based approaches are however also known, which can be used particularly advantageously in the presence of dynamic objects, which can naturally also be classified by appropriate classifiers. As already illustrated, the classifiers can preferably be available as algorithms implemented in software. Learning classifiers are also conceivable.

There are now inquiry criteria, which can lead in specific, particularly rarely occurring cases to the transmission of camera images of an object to a mobile communication device of the user and to the inquiry of the user with respect to the classification. Such an inquiry criterion can be that an object could not be classified or at least could not be classified with sufficient certainty, such as in case of a reliability value below a threshold value, as an obstacle or not an obstacle. An inquiry criterion that can also be used is that a trajectory to be used in the future to the destination can no longer be calculated, wherein the omission of a certain object would allow at least one such trajectory. The objects that cannot be classified or cannot be classified accurately enough by the classifiers or the interfering object classified as obstacle then constitute within the meaning of the inquiry criterion objects to be classified by the user of the motor vehicle, which objects can therefore be presented as images to the user using the communication link to the mobile communication device as a result of the cameras provided among the environmental sensors. The driver can carry out the classification, which is then transmitted back as classification information to the motor vehicle so that the latter can appropriately take the classification information into account in the trajectory calculation.

In other words, this means that the motor vehicle itself already carries out classifications of objects and therefore also reacts accordingly if the objects are known and classified as obstacles, such as by using evasive trajectories or further drive based on a known deception of at least one environmental sensor, by incorrect road markings and the like, for example. However, if the objects are unknown or an alternate route cannot be calculated, the information regarding these objects is transmitted to a mobile unit, the mobile communication device, so that the user, typically a driver of the motor vehicle or a person monitoring the parking environment, is asked to classify the object or give the approval to drive.

In this way, a direct control of the motor vehicle by the driver or the other person does not take place otherwise, instead, only a classification is performed. The entire operation of the motor vehicle can be improved and an erroneous getting stuck of a motor vehicle in automatic operation can in particular be avoided. In this case, the driver or the other person is responsible for the decision of the driving over an object since he ultimately deliberately agrees to the further drive by the classification as "not an obstacle." In this way, the driver or the other person is drawn upon in critical situations as classifiers without a permanent monitoring of the fully automatic operation of the motor vehicle being required.

A development of the present invention provides that a cellular telephone, in particular a smartphone, is used as mobile communication device. Cellular telephones, in particular smartphones, are particularly suited as mobile communication device since they can be taken along by many users of motor vehicles in any case and since smartphones in particular offer an easily implementable possibility by means of so-called "apps" to accept incoming camera images and possibly additional information, to display them, and to accept the input of the user, after which the classification information is transmitted back to the motor vehicle.

In the process, the transmission of the camera image and the classification information may take place via different, known, wireless communication links, preferably at least partially via a mobile radio network, in particular when using a cellular telephone, and/or a WLAN. Generally speaking, in doing so, it is not necessarily required to carry out the transmission of the camera image and the classification information directly between the motor vehicle and the communication device, but it may on the contrary be extremely advantageous for the transmission to take place via a stationary server device outside the motor vehicle, in particular a back end. Such a server device, which can, for example, be assigned to a drivable environment, in particular a parking environment, such as a parking garage, can in this respect also implement additional functions beneficial to the fully automatic operation of motor vehicles in the environment, for example provide a digital map of the environment and the like. Within the framework of the present invention, such a server device can initially be advantageously used to store transmitted camera images (as well as possibly additional information) and the classification information as event information so that they can be tracked subsequently and incorrect classifications by the user can, for example, be tracked.

It is, however, particularly advantageous if digital map data describing the area (the environment), in which the motor vehicle is moved, is stored on the server device, wherein the objects classified by a user are stored in the map data with the assigned classification information. In this way, an extension of the digital map data therefore takes place by the classification process on the user side, which extension offers an excellent basis for subsequent motor vehicles to continue the fully automatic operation in particular also without a prior inquiry of the user by drawing upon classification information that is already available in the map and that comes from other users. In doing so, it may be particularly advantageously provided that classification information of several users for the same object are evaluated statistically to total classification information. A statistical evaluation of the classification information regarding a certain object is therefore conceivable in order to exclude individual incorrect classifications by users. It may, for example, be provided that total classification information is not provided to other automatically operated motor vehicles until a certain quantity of individual classification information on the part of users is available, which information can be evaluated to preferably avoid incorrect classifications, wherein in order to classify an object, "not an obstacle" can, for example, be stored in the digital map data as total classification information if a percentage, exceeding a threshold value, of the users, such as over 60% of the users, have classified the object as "not an obstacle." Such designs can particularly advantageously be used in parking environments, such as parking garages, to which the server device can be assigned.

Overall, it is particularly advantageous if the digital map data are transmitted by the server device to the motor vehicle and are taken into account in the automatic guidance of the motor vehicle. For example, in the case of a parking environment, the current version of the digital map data can always be transmitted to the motor vehicle upon entry of the motor vehicle into the parking environment, which motor vehicle controls the automatic operation based on these digital map data, which in particular advantageously also contain the classification information of other users, which information is in particular statistically evaluated to total classification information. The classification decisions of other users are thus further utilized in a beneficial manner.

In an advantageous development, at least one piece of additional information, in particular a piece of additional information transmitted with the camera image, regarding the object to be classified can be displayed on the mobile communication device. It is thus possible to deliver additional information that can offer the user an improved estimation of the overall driving situation of the motor vehicle. Advantageously, it may, for example, be provided in this context that a map of the current environment of the motor vehicle, in which map the location of the object to be classified and/or of additional, already classified objects and/or of the motor vehicle is shown, and/or dimensions, determined by environmental sensors, in particular ultrasonic sensors and/or radar sensors and/or laser scanners, of the object are used as additional information. Other sensor data of additional environmental sensors may also be useful in addition to the camera. The object can in this way be sorted by the user into an overall context and be evaluated better.

It is furthermore advantageous if the camera image is post-processed, in particular deskewed, for better readability prior to being displaying. Many cameras used as environmental sensors and delivering sensor data for vehicle systems use in particular image formats and optics, such as wide-angle lenses or fisheye optics in order to allow detection as wide-ranging as possible. The camera images produced are partially skewed and possibly cannot be interpreted by the user directly and easily. It is therefore proposed to post-process the camera images such that they can be read more easily by a user, wherein a deskewing particularly preferably takes place. Another variant provides that in case of an object located in the overlap region and/or contact region of the detection regions of different cameras, the camera image to be transmitted is composed of at least two raw images, respectively showing in particular a part of the object, of different cameras. This process is also known under the key word "stitching" of images.

As already indicated, a software application is preferably used to execute the steps to be performed on the part of the mobile communication device. Especially on the so-called smartphones but also, for example, on tablets or the like as mobile communication devices, such software applications are known as so-called "apps." Such an application thus makes it possible that a camera image of the object or of the situation as well as possibly a map illustration can be displayed for the user of the motor vehicle on his mobile end device. The input is accepted, in particular via suitable operating elements, and transmitted back, preferably via a server device as already mentioned.

In a preferred embodiment, cameras covering the environment of the motor vehicle in the entire angular range, in particular at least four cameras provided with a wide-angle lens, are used. Such camera arrangements are already known as so-called top-view cameras since they are often times arranged, for example, along the edge of the roof in order to be able to detect the environment of the motor vehicle in the full 360° of the angular range. Such top-view cameras also serve, for example, vehicle systems that can allow for an all-around vision around the motor vehicle in the motor vehicle and/or can produce a type of top-view image of the motor vehicle. They can be used particularly advantageously within the framework of the present invention since objects can be recorded in a camera image independently of the angle relative to the motor vehicle and can thus be displayed to a user on the mobile communication device.

In addition to the method, the invention also relates to a monitoring system, comprising an automatically guidable motor vehicle, in particular a passenger car, with environmental sensors, including at least one camera, the detected sensor data of which can be evaluated on the part of a control device with respect to objects to be taken into account in trajectory planning, which objects can be classified as an obstacle or not an obstacle by means of at least one classifier evaluating the associated sensor data, and a mobile communication device, wherein the monitoring system is designed to execute the method according to the invention. All statements regarding the method according to the invention can be analogously transferred to the monitoring system according to the invention, with which the aforementioned advantages can thus likewise be attained.

Figure 1:
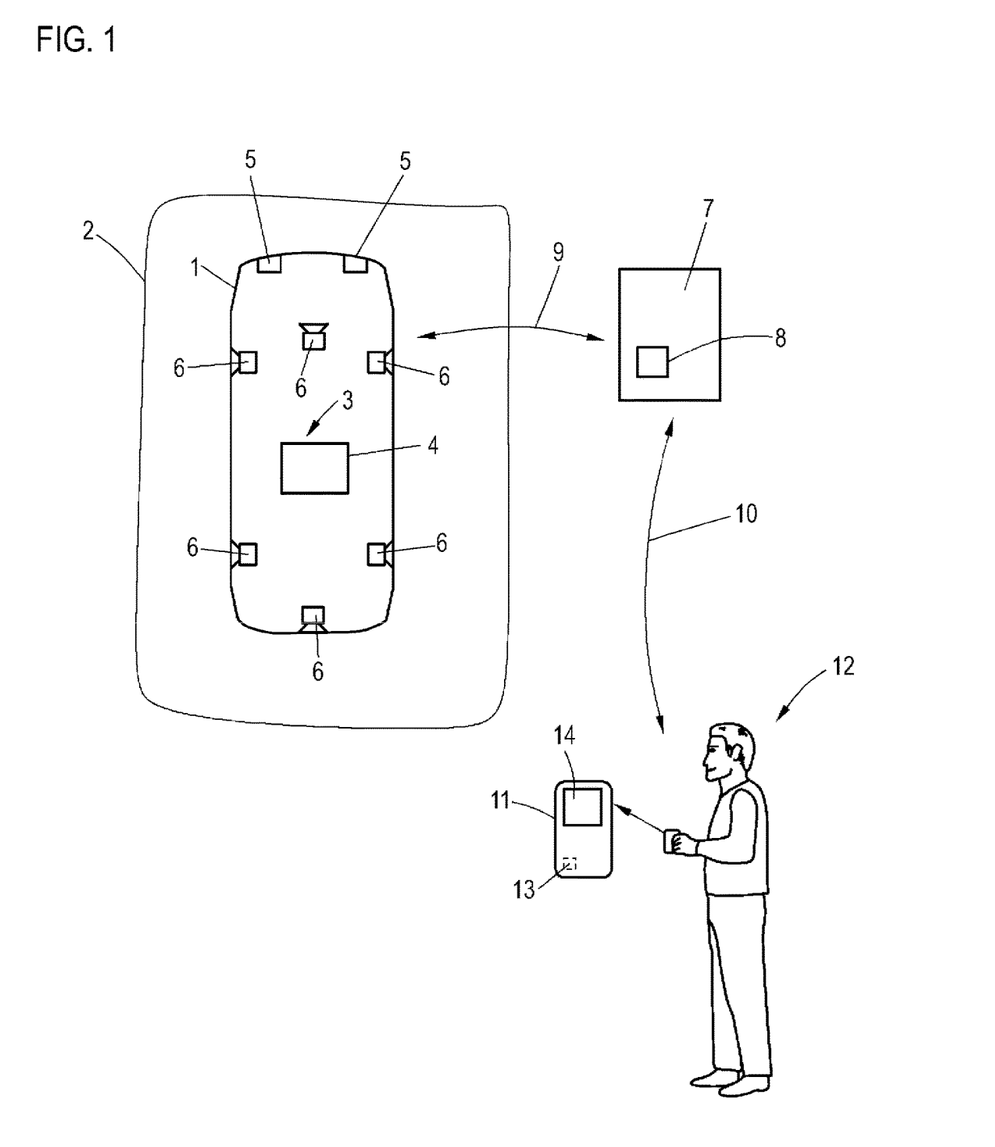
FIG. 1 illustrates a monitoring system, according to some embodiments.
Figure 2:
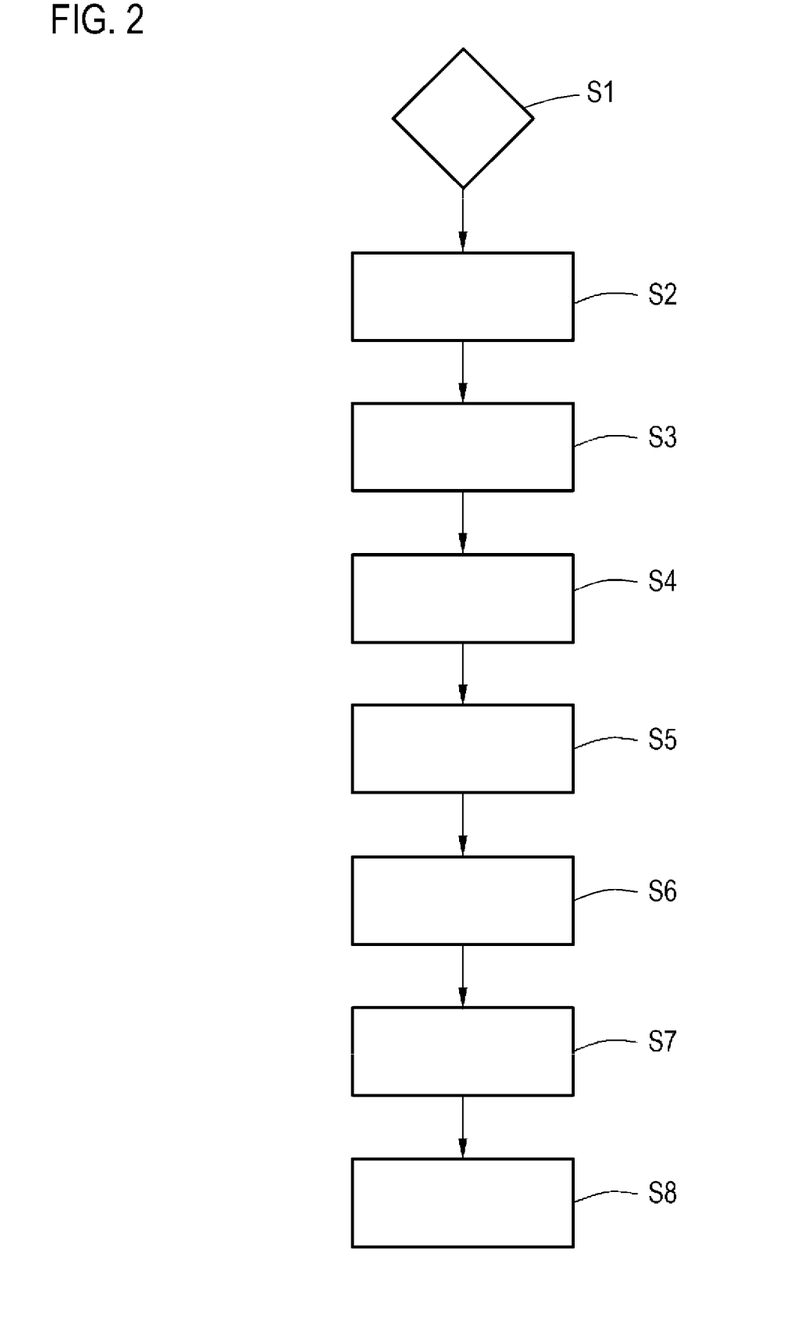
FIG. 2 illustrates a flow chart of an exemplary method, according to some embodiments.
Figure 3:
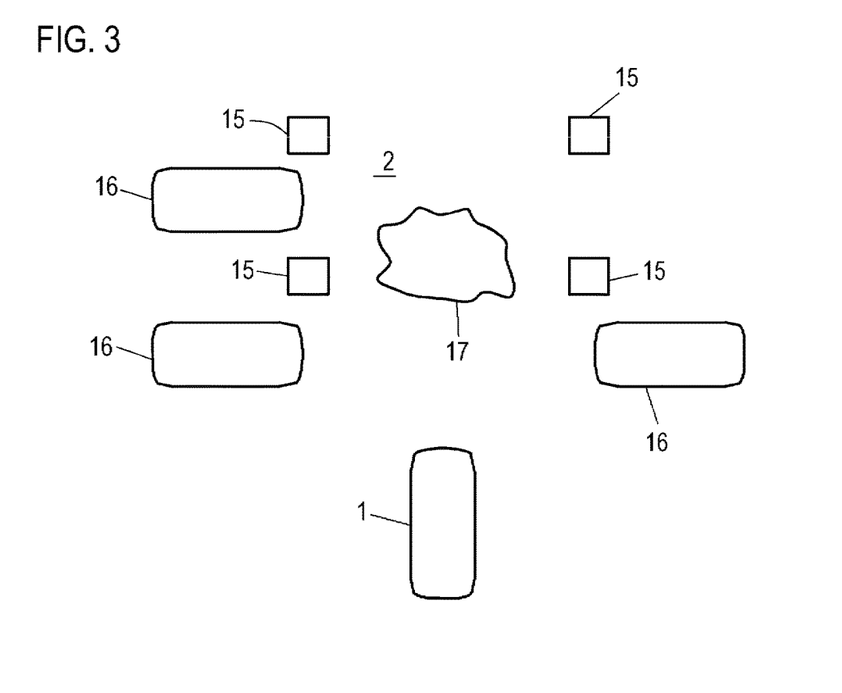
FIG. 3 illustrates an exemplary driving situation, according to some embodiments.
Figure 4:
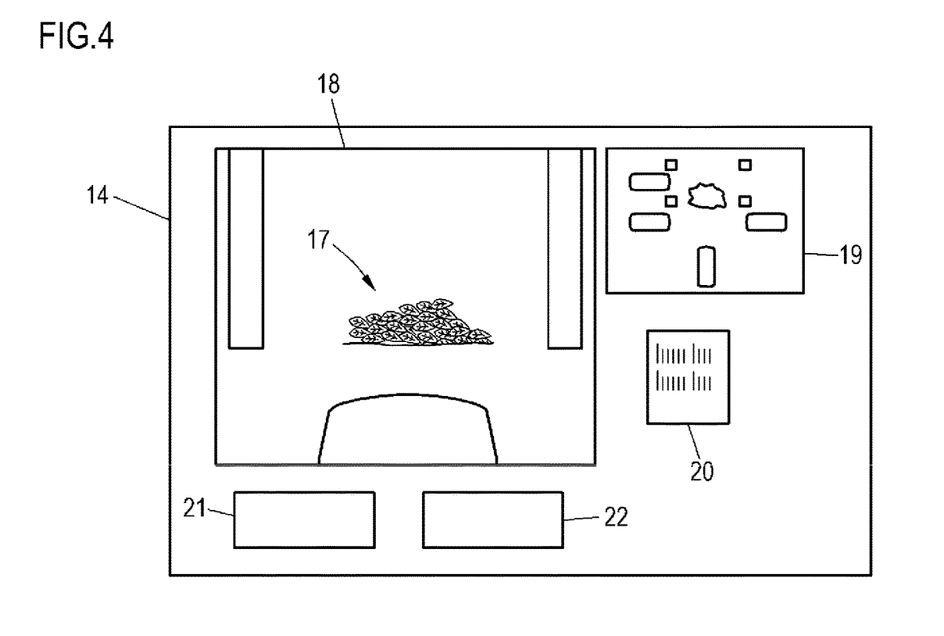
FIG. 4 illustrates an exemplary illustration on a mobile communication device, according to some embodiments.
Figure 5:
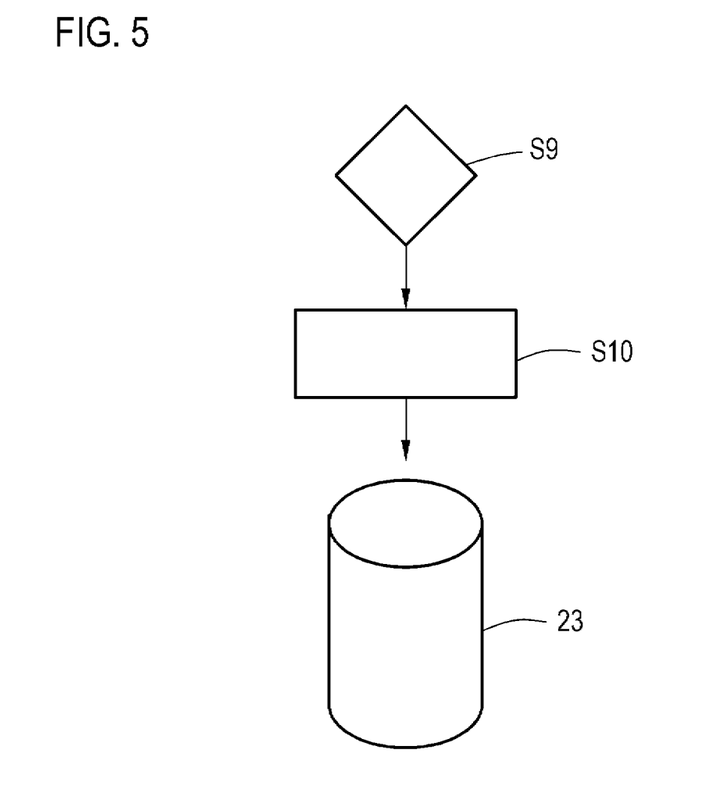
FIG. 5 illustrate the statistical evaluation of classification information, according to some embodiments.

Additional advantages and individual details of the present invention result from the exemplary embodiments described below as well as the drawings. The following is shown:

FIG. 1 a monitoring system according to the invention,

FIG. 2 a flow chart of an exemplary embodiment of the method according to the invention, FIG. 3 an exemplary driving situation, FIG. 4 an exemplary illustration on a mobile communication device, and FIG. 5 the statistical evaluation of classification information.

FIG. 1 shows a monitoring system according to the invention in the form of a schematic diagram, which monitoring system in the present case is used in a parking environment, in particular a parking garage, in which motor vehicles that are appropriately designed can drive driverlessly and in a manner completely automatically guided to their respective parking space and parked there or removed from there. Naturally, the method can however also be transferred to other areas that can be driven by motor vehicles fully automatically.

A motor vehicle 1 is located in the parking environment 2, which is only schematically depicted here, and is operated fully automatically without a driver, for which purpose an appropriate vehicle system 3 with a control device 4 is used, which is also designed to execute the steps on the motor vehicle side of the method according to the invention and to be explained below. The motor vehicle 1 comprises a plurality of environmental sensors, of which only the radar sensors 5 and six cameras 6 are shown in this case for the sake of clarity, which cameras are respectively provided with a wide-angle lens and can thus cover the environment of the motor vehicle over the entire 360° angular range.

The sensor data of the environmental sensors are, for example, fused by the control device 4 in an environmental model of the motor vehicle 1, wherein the environmental model in the present case describes different objects in the environment of the motor vehicle 1 by means of the sensor data. By means of classifiers implemented by software in the control device 4, it can be determined whether the objects are considered to be an obstacle or can be driven over or under. Naturally, the classifiers can also deliver additional, more accurate information regarding the objects, such as whether the object is another parked motor vehicle, a traffic sign, a pillar, and the like, if appropriate classifiers are provided.

Based on the classified object in the environmental model, an automatic guidance of the motor vehicle 1 in the parking environment 2 is possible. This is furthermore supported by digital map data transmitted by a server device 7, which also belongs to the monitoring system, serves as back end server, and is assigned as infrastructure device to the parking environment 2, said map data being held available there in a storage device 8. Between the server device 7 and the motor vehicle 1 therefore exists a communication link 9, in the present case a WLAN connection, which is established upon the motor vehicle 1 driving into the parking environment 2. Naturally, other types of communication links are also conceivable for the communication link 9.

A communication link 10 to a mobile communication device 11 of a user 12 of the motor vehicle 1 can also be established via the server device 7 or directly by the motor vehicle 1, wherein the communication link 10 is in the present case established via a mobile radio network. Accordingly, the communication device 11, which is carried by the user 12, is a cellular telephone, specifically a smartphone. This smartphone, as is basically known, comprises a display 14, on which information can be displayed. On the mobile communication device 11, a software application 13 ("app") is installed, which is also used within the framework of the method according to the invention and now to be explained.

In the now illustrated exemplary embodiment of the method according to the invention, cf. FIG. 2, it is assumed that any communication between the motor vehicle 1 and the mobile communication device 11 takes place via the server device 7, i.e. the communication links 9 and 10, for which purpose the motor vehicle 1 can communicate to the server device 7 a communication address of the communication device 11 in the mobile radio network, for example, i.e. specifically a telephone number, but also possibly a user ID that was generated when the connection to the motor vehicle 1 was established.

It should furthermore be noted in advance that upon motor vehicle 1 driving into the parking environment 2, the server device 7 provided the motor vehicle 1 with the digital map data, available in the server device 8, of the parking environment 2 in order to support the fully automatic, driverless operation of the motor vehicle 1 by means of the vehicle system 3.

FIG. 2 now shows a flow chart of an exemplary embodiment of the method according to the invention. During the fully automatic operation of the motor vehicle 1, it is continuously checked in a step S1 whether an inquiry criterion for the inquiry regarding an object to be classified by the user 12 is fulfilled. In doing so, two inquiry criteria are taken into consideration in the present case. The first inquiry criterion checks whether an object detected by the environmental sensors cannot be classified or cannot be classified reliably enough, i.e. whether none of the classifiers in the control device 4 delivered a result that classified the object as an obstacle or not an obstacle, or whether a possible classification is not reliable enough, i.e. a threshold value for a reliability check is fallen below. The second inquiry criterion is always triggered if at least one object blocks the further drive of the motor vehicle 1 such that a current destination would no longer be reachable. In this case, the object to be classified by a user, the at least one object impeding the further drive, in particular the at least one object that was classified with the lowest certainty and/or that as the only object or as one of a few objects impedes the further drive. Naturally, appropriate improvements of the inquiry criterion are provided so that not all objects in the environment of the motor vehicle 1 are selected as objects to be classified by the user.

FIG. 3 shows a driving situation of the motor vehicle 1 within the parking environment 2 by way of example. Seen can be parking spaces separated by columns 15 and at least partially occupied by additional motor vehicles 16. In front of the motor vehicle 1 is located an object 17 that cannot be classified, in the present case a heap of leaves. Since the heap of leaves 17 cannot be classified by the control device 4 of the motor vehicle 1, it is unclear whether it constitutes an obstacle for the further drive. The first inquiry criterion in step S1 is thus fulfilled. In the present case, the second inquiry criterion in step S1 is however also fulfilled by way of example since the motor vehicle 1 obviously cannot classify the object 17 as being able to be driven over without danger, i.e. as "not an obstacle," and cannot therefore continue its route since the object 17 cannot be driven around on the left or on the right side. In other words, a "getting stuck" of the motor vehicle is imminent since no alternate trajectory can be calculated.

If the at least one inquiry criterion in step S1 is fulfilled, communication information regarding the object 17 to be classified by the user 12 is compiled in a step S2. This communication information includes on the one hand a camera image of the camera 6 directed toward the front, which image was deskewed appropriately for better readability since the properties of the respective wide-angle lens are known. Additional information regarding the object 17, which were also collected by the environmental sensors, are furthermore added, such as dimensions of the object 17; finally, a map of the current environment of the motor vehicle 1 is added to the communication information as additional information, which map shows the position of the motor vehicle 1, of the object 17, as well as of additional objects. This communication information is initially transmitted in step S2 to the server device 7, which appropriately stores a reference to the inquiry and uses the communication link 10 to furthermore transmit the communication information to the mobile communication device 11, which takes place in step S3.

In step S4, the software application 13 accepts the communication information, outputs optical and/or acoustic and/or tactile reference information to the user 12 so that said user is made aware of the inquiry, and generates an illustration for the display 14 as shown by way of example in FIG. 4. Obviously, a large part of the illustration on the display 14 is taken up by the camera image 18. Shown smaller are the map 19 as well as other additional information 20, such as the dimensions. Below the camera image 18 are illustrated two operating elements 21, 22, by means of which the user can classify the object 17, which can also be highlighted in the camera image 18. If the user 12 operates operating element 21, a classification information is generated that describes the object 17 as an obstacle; if said user operates operating element 22, a classification information is generated that classifies the object 17 as "not an obstacle." Naturally, additional functions can also be provided by the software application 13, such as an enlargement of the map 19, a display of other additional information, and the like.

In step S5, the input of the user 12 is therefore accepted via the operating elements 21, 22 and the classification information is generated, which is initially transmitted back to the server device 7 in step S6. In the server device 7, the classification information is stored in a step S7 with the associated object 17 in the storage device 8, is further evaluated, which is to be explained further with reference to FIG. 5, and is transmitted to the motor vehicle 1 via the communication link 9.

In the motor vehicle 1, the classification information is appropriately taken into account for the further automatic guidance of the motor vehicle 1 in step S8. In the case illustrated in FIG. 3, the driver will presumably mark the heap of leaves, i.e. the object 17, as not an obstacle, i.e. being able to be driven over, so that the automatic driving operation can be continued.

FIG. 5 finally shows a flow chart of the statistical evaluation of classification information, which concerns the same object 17 to be classified, in the server device 7. In a step S9, it is checked there whether a sufficient quantity of classification information of different users 12 is available in order to be able to carry out a statistical evaluation. If this is the case, it is checked in step S10 which classification most of the users 12 have carried out and whether the percentage of the users 12 who have carried out this classification exceeds a threshold value. If the latter is the case, total classification information 23 is generated, stored in the digital map data in a manner associated with the object 17, and thus made available to other motor vehicles.

In this case, step S3 in FIG. 1 can be extended in that if total classification information 23 regarding the object 17 is already available, this information is immediately transmitted back to the motor vehicle 1 as response so that the inquiry of the user is no longer necessary and it can be continued directly with step S8.

The invention claimed is:

1. A method, comprising:
   operating an automatically guided, driverless motor vehicle, wherein sensor data detected by environmental sensors, including at least one camera, of the motor vehicle are evaluated with respect to objects to be taken into account in trajectory planning, which objects can be classified as an obstacle or not an obstacle using at least one classifier evaluating the detected sensor data;
   in response to an object that cannot be classified at all or cannot be classified with sufficient certainty as an obstacle or not an obstacle and/or in response to at least one object preventing further automatic guidance of the motor vehicle to a current destination, taking at least one camera image of the object using the at least one camera;
   transmitting the at least one camera image to a portable mobile communication device carried along by a user of the motor vehicle, wherein the at least one camera image is displayed on the portable mobile communication device and wherein an input of the user classifying the object as an obstacle or not an obstacle is accepted as classification information;
   receiving, at the motor vehicle, the classification information; and
   taking into account the classification information in the further automatic guidance of the motor vehicle.

2. The method according to claim 1, wherein the portable mobile communication device comprises a cellular telephone.

3. The method according to claim 1, wherein the transmitting the at least one camera image comprises transmitting the at least one camera image using a stationary server device outside the motor vehicle, at least partially using a mobile radio network, or using a wireless local area network (WLAN).

4. The method according to claim 3, wherein digital map data describing an area, in which the motor vehicle is moved, is stored on the stationary server device and wherein the object classified by the user is stored in the digital map data with the classification information.

5. The method according to claim 4, wherein classification information of several users for the object is evaluated statistically to an overall classification information.

6. The method according to claim 4, further comprising:
   receiving, at the motor vehicle, the digital map data from the server device; and
   wherein taking into account the classification information includes taking into account the digital map data in the further automatic guidance of the motor vehicle.

7. The method according to claim 1, wherein the at least one camera image is post-processed prior to being displayed.

8. The method according to claim 1, wherein a software application is used to execute steps to be performed by the portable mobile communication device.

9. The method according to claim 1, wherein the environmental sensors comprise at least four cameras provided with a wide-angle lens.

10. The method according to claim 1, further comprising:
    displaying on the portable mobile communication device a piece of additional information transmitted with the at least one camera image, regarding the object to be classified.

11. The method according to claim 10, wherein the additional information comprises a map of current environment of the motor vehicle, in which a location of the object to be classified, locations of already classified objects, or a location of the motor vehicle is shown.

12. The method according to claim 10, wherein the additional information comprises dimensions of the object determined by environmental sensors.

13. The method according to claim 1, wherein the portable mobile communication device comprises a smartphone.

14. The method according to claim 1, wherein the receiving the classification information comprises receiving the classification information using a stationary server device outside the motor vehicle, at least partially using a mobile radio network, or using a wireless local area network (WLAN).

15. A monitoring system, comprising:
    an automatically guidable motor vehicle comprising:
       environmental sensors, including at least one camera; and
       a control device configured to:
          evaluate detected sensor data with respect to objects to be taken into account in trajectory planning, which objects can be classified as an obstacle or not an obstacle using at least one classifier evaluating the detected sensor data in response to an object that cannot be classified at all or cannot be classified with sufficient certainty as an obstacle or not an obstacle and/or in response to at least one object preventing further automatic guidance of the motor vehicle to a current destination, take at least one camera image of the object using the at least one camera;

transmit the at least one camera image to a portable mobile communication device carried along by a user of the motor vehicle, wherein the at least one camera image is displayed on the portable mobile communication device and wherein an input of the user classifying the object as an obstacle or not an obstacle is accepted as classification information;

receive the classification information; and take into account the classification information in the further automatic guidance of the motor vehicle.

\* \* \* \* \*